US012112729B2

(12) United States Patent
Mumberg et al.

(10) Patent No.: US 12,112,729 B2
(45) Date of Patent: Oct. 8, 2024

(54) HEADPIECE FOR A TRANSVERSE FLUTE, AND TRANSVERSE FLUTE

(71) Applicants: Nicole Liesel Mumberg, Baunatal (DE); Arnd Mumberg, Baunatal (DE); Alina Ilona Mumberg, Baunatal (DE); Regina Engelhardt, Kassel (DE); Arne Werner Horst Siebling, Kassel (DE)

(72) Inventors: Nicole Liesel Mumberg, Baunatal (DE); Arnd Mumberg, Baunatal (DE); Alina Ilona Mumberg, Baunatal (DE); Regina Engelhardt, Kassel (DE); Arne Werner Horst Siebling, Kassel (DE)

(*) Notice: Subject to any disclaimer, the term of this patent is extended or adjusted under 35 U.S.C. 154(b) by 179 days.

(21) Appl. No.: 17/782,879

(22) PCT Filed: Dec. 7, 2019

(86) PCT No.: PCT/DE2019/101056
§ 371 (c)(1),
(2) Date: Jun. 6, 2022

(87) PCT Pub. No.: WO2021/110186
PCT Pub. Date: Jun. 10, 2021

(65) Prior Publication Data

US 2023/0008370 A1 Jan. 12, 2023

(51) Int. Cl.
*G10D 9/02* (2020.01)
*G10D 7/026* (2020.01)

(52) U.S. Cl.
CPC ............... *G10D 7/026* (2013.01); *G10D 9/02* (2013.01)

(58) Field of Classification Search
CPC G10D 7/026; G10D 9/02; G10D 7/00; G10D 9/00
See application file for complete search history.

(56) References Cited

U.S. PATENT DOCUMENTS

| | | | |
|---|---|---|---|
| 3,062,084 | A | 11/1962 | Ogilvie |
| 2009/0293701 | A1 | 12/2009 | Rozier |
| 2019/0180724 | A1 | 6/2019 | Marius |

FOREIGN PATENT DOCUMENTS

| | | | |
|---|---|---|---|
| CH | 1452 | A | 12/1889 |
| CN | 107086030 | A | 8/2017 |
| CN | 109036344 | A | 12/2018 |
| DE | 49789 | C | 11/1889 |
| DE | 4242413 | C1 | 11/1993 |
| FR | 624703 | A | 7/1927 |

OTHER PUBLICATIONS

International Search Report dated Sep. 7, 2020; International Application No. PCT/DE2019/101056.
Screen captures from YouTube video clip entitled "What kind of sound does it make? ? Double bass flute!", 10 pages, uploaded on Nov. 18, 2015 by user "Masakuzu Tachibana Flutist". Retrieved from Internet https://www.youtube.com/watch?v=q-kCFcqTwf4.
Japanese Office Action issued in JP2022-533147, dated Feb. 6, 2024, pp. 1-11.

*Primary Examiner* — Kimberly R Lockett
(74) *Attorney, Agent, or Firm* — Dinsmore & Shohl LLP

(57) ABSTRACT

A headpiece is provided for a transverse flute having a first leg and a second leg, which is connectable to a tube of the transverse flute. The two legs are arranged at an acute angle to one another.

14 Claims, 2 Drawing Sheets

HEADPIECE FOR A TRANSVERSE FLUTE, AND TRANSVERSE FLUTE

CROSS-REFERENCE TO RELATED APPLICATIONS

This application is the U.S. National Stage of PCT/DE2019/101056 filed Dec. 7, 2019, the content of which is incorporated herein by reference in its entirety.

FIELD OF THE INVENTION

The invention relates to a head joint for a transverse flute and to a transverse flute having such a head joint.

BACKGROUND OF THE INVENTION

A transverse flute is typically designed such that it is designed as a straight elongated component overall. The transverse flute is held approximately in a horizontal orientation to play it. In this respect, the head joint of the transverse flute is located at the level of the lips of the flautist so that he can blow transversely on the embouchure hole in the region of the head joint. The tube extends from there in the horizontal direction toward the right side of the flautist in the normal case. The flautist accordingly has to stretch both arms to the right side to be able to play the transverse flute.

Apart from a straight head joint, the use of a bent head joint that is bent by 180° is also known. A shortening of the transverse flute in the longitudinal direction is hereby achieved, which in particular facilitates the playing of the transverse flute for children. When playing, the position of the transverse flute having such a head joint corresponds to the position of a normal transverse flute. I.e. it is likewise held in an approximately horizontal orientation.

A transverse flute is known from document DE 42 42 413 C1 that has an angled head joint. The head joint is specifically made up of a plurality of straight parts that are each connected to one another at an angle. In this respect, the two outermost parts include an angle in the range from 115 to 120°. An angled shape thus results in the assembled state. To play the transverse flute, the section having the embouchure hole is held in the horizontal direction. The tube of the transverse flute extends obliquely to the bottom right in an extension of this section on the right side of the flautist. The flautist accordingly has to stretch both arms to the right side to be able to play the transverse flute.

A similar solution is known from document US 2019/0180724 A1.

A transverse flute is known from CH 1452 that can substantially be held oriented in the vertical direction centrally in front of the body. For this purpose, the head joint is made up of three sections: a first curved section that is connected to the tube of the transverse flute and is bent by 90°, a second curved section to which the first curved section is connected and is bent by 180°, and a third section of straight shape at which the embouchure hole is provided and which is arranged in an extension of the second section.

SUMMARY OF THE INVENTION

It is the object of the invention to further develop a transverse flute such that it can be played in a relaxed body posture and/or is optimized with respect to the sound field produced.

The object in accordance with the invention is achieved by a head joint for a transverse flute having the features as disclosed herein. The object in accordance with the invention is further achieved by a transverse flute having the features as disclosed herein.

The underlying insight of the invention is that with solutions known from the prior art, either a body posture aligned to one side, a complex hand position, and/or a restricted sound quality has/have to be accepted. Specifically, the position aligned to the right side can result in postural defects, on the one hand, and in a restricted air volume, since the respiratory organs are constricted. In addition, due to the alignment of the transverse flute to the right, the sound field produced is likewise oriented to the right. With the transverse flute known from document CH-PS 1452, said transverse flute can admittedly be vertically oriented centrally in front of the body. However, a complexly shaped head joint having pronounced curves is required for this that is not only complex in production, but with which the sound quality is also restricted due to the pronounced curves. The hands are additionally forced into an unfavorable drawn up position so that the wrists have to hold the weight of the flute acutely angled downwardly. There are also individual sounds in which—with today's key mechanism assumed—only one key is actuated and this may be at the foot end. In an implementation of the solution known from the document CH 1452, this would have the result that the transverse flute slips to and fro since it only contacts the lower lip and is not held by the teeth. In accordance with the invention, a head joint for a transverse flute is therefore shaped such that a flautist can adopt a straight posture and the sound quality can simultaneously be maintained or even improved.

A head joint in accordance with the invention for a transverse flute has two legs that are arranged at an acute angle with respect to one another. In other words, the head joint is substantially of L shape, with the two legs not being oriented at a right angle to one another, but rather including an acute angle. In this respect the embouchure hole can in particular be provided in the region of the first leg, while the second leg is connectable to the tube of the transverse flute.

If such a head joint is connected to a tube of a transverse flute, the tube joins the tube in an extension of the second leg. To play the transverse flute, the first leg having the embouchure hole is held substantially in a horizontal alignment. Due to the acute angle between the first leg and the second leg, the transverse flute extends, starting with the second leg from the one side to the other side, e.g. from the top left to the bottom right—with respect to the vertical direction at the center of the body. In this respect, the left hand grips e.g. the upper section of the transverse flute located at the left side, while the right hand grips the lower section of the transverse flute located at the right side. An (at least almost) symmetrical arm position is thus made possible and thus also a symmetrical body posture overall. At the same time, a sound field that is substantially symmetrical toward both sides can be produced by such an orientation of the transverse flute. I.e. the flautist himself can perceive the sound in the same way with both ears.

No complex structure with a plurality of angle pieces or curved pieces is required for the reaching of such a balanced orientation here. This can rather already be achieved in accordance with the invention simply by the two legs of the head joint that are arranged at an acute angle to one another. In this respect, no pronounced curves or even angled transitions are required that would impair the sound quality.

The angle between the two legs is preferably selected such that the flautist can adopt a posture that is as symmetrical as possible. This in particular depends on the length of the legs, but also on the dimensions of the further parts of the transverse flute for which the head joint in accordance with the invention should be used. In accordance with an embodiment of the invention, the angle between the two legs amounts to a value in the range from 50 to 80° and preferably in the range from 70 to 75°. The value can specifically amount to 72°. An at least approximately balanced posture can be achieved for conventional transverse flutes by such a design of the head joint.

To form the angle between the first leg and the second leg, they can e.g. be connected to one another by an angular piece. They are, however, preferably connected to one another by an arcuate transition curve so that an angle free and edge free transition from the first leg to the second leg can be achieved. This in particular has a positive effect on the air column that can be produced and thus on the sound quality.

The radius of curvature of the transition curve amounts to at least 2 cm in accordance with an embodiment of the invention. A gentle transition from the first leg to the second leg and thus an air column that is as disrupted as little as possible can thus be achieved. At the same time, the conventional overall length of a transverse flute is not exceeded.

The first leg, the transition curve, and/or the second leg can selectively be formed as one piece or as separate components. In the design as separate components, they can in particular be releasably connected to one another. In accordance with an embodiment, at least the first leg and the transition curve are formed as separate components. An already existing straight head joint such is as known in accordance with the prior art can thus be used, for example, and can be connected to the transition curve and to the second leg formed thereon or arranged thereon—to form a head joint in accordance with the invention. A simple change between a straight head joint and a head joint in accordance with the invention is thus possible. It can furthermore be advantageous to be able to break the head joint down into individual parts to e.g. be able to stow it in a space saving manner or for cleaning purposes.

Specifically, the first and/or second leg(s) can have a connection section for the releasable connection to the transition curve, said connection section being able to be inserted into a reception section of the transition curve at the end side and is held therein by a force fit. If the reception section and the connection section each have an annular shaped cross-section with respect to one another, a degree of freedom can be implemented with respect to the alignment of the first leg with the transition curve and/or of the transition curve with the second leg.

Specifically, the first and/or second leg(s) can then be installed at the transition curve in any desired orientation in the peripheral direction of the annular shape. A flautist can thus flexibly adopt the orientation suitable for him.

In accordance with an embodiment, the first leg and the second leg and the transition curve extend in a common plane. I.e. a transverse flute having a mouthpiece in accordance with the invention substantially extends in one plane. Alternatively, the head joint can be configured such that the first leg, the second leg, and the transition curve do not lie in one plane, but rather such that the two legs are arranged at an angle with respect to one another in two spatial directions such as is known from the document US 2019/0180724 A1.

As stated above, the embouchure hole is in particular formed in the region of the first leg. For this purpose, an embouchure plate that forms the embouchure hole is preferably arranged at the first leg. Alternatively, the embouchure plate having the embouchure hole can, however, also be formed by a separate component that is connected to the first leg, e.g. is inserted onto or into it.

As likewise stated above, the second leg is configured such that it can be connected to the tube of the transverse flute. Specifically, a connection section is provided at the second leg for this purpose. It can in particular be configured such that the connection section can be pushed int the tube and can be connected thereto with a force fit.

When the connection section is formed as annular, it can be achieved that the head joint can be connected to the tube in any desired orientation in the peripheral direction of the annular form. A flautist can thus flexibly adopt the orientation suitable for him.

The head joint in accordance with the invention can generally be produced from any desired material that has a sufficient strength. The typical materials for transverse flutes are preferably used such as wood, metal (including precious metals), an alloy, or carbon. A plurality of materials can also be combined. To name only a few examples, the head joint can be made from gold, silver, titanium, brass, aluminum, or granadilla.

The object in accordance with the invention is further achieved by a transverse flute having a head joint in accordance with the invention.

To also be able to hold the transverse flute easily in the substantially vertical orientation or in an orientation slightly inclined thereto, at least one support element is preferably arranged at the tube of the transverse flute. This support element here tends to project from the tube transversely to the longitudinal direction and is in particular configured such that the transverse flute can be supported thereby by the thumb of the right hand. Specifically, two support elements can be provided at different heights so that the transverse flute can be held steadily by both hands when playing.

To be as flexible as possible, the at least one support element can be arranged adjustably and/or removably along the tube and/or in the peripheral direction of the tube. For example, the support element can be removed when the transverse flute should not be used with the head joint in accordance with the invention, but rather with a straight head joint known from the prior art. If a change is again made to the head joint in accordance with the invention, the support element can again be attached to the tube at the desired position.

The statements on the head joint in accordance with the invention apply accordingly with respect to further preferred embodiments of the transverse flute in accordance with the invention.

Advantageous further developments result from the description and the drawings. The advantages named in the description of features and of combinations of a plurality of features are only exemplary and can come into effect alternatively or cumulatively without the advantages necessarily having to be achieved by embodiments in accordance with the invention. The features named in the claims and in the description are to be understood with respect to their number that exactly this number or a larger number than said number is present without this requiring an explicit use of the term "at least". If therefore, for example, a support element is spoken of, it is to be understood such that exactly one support element, two support elements, or a plurality of support elements is/are present. These features can be supplemented by other features or can be the only features the respective product consists of.

BRIEF DESCRIPTION OF THE DRAWINGS

Further measures improving the invention will be shown in more detail below together with the description of preferred embodiments of the invention with reference to the Figures. There are shown.

DETAILED DESCRIPTION OF THE INVENTION

Figure 1:
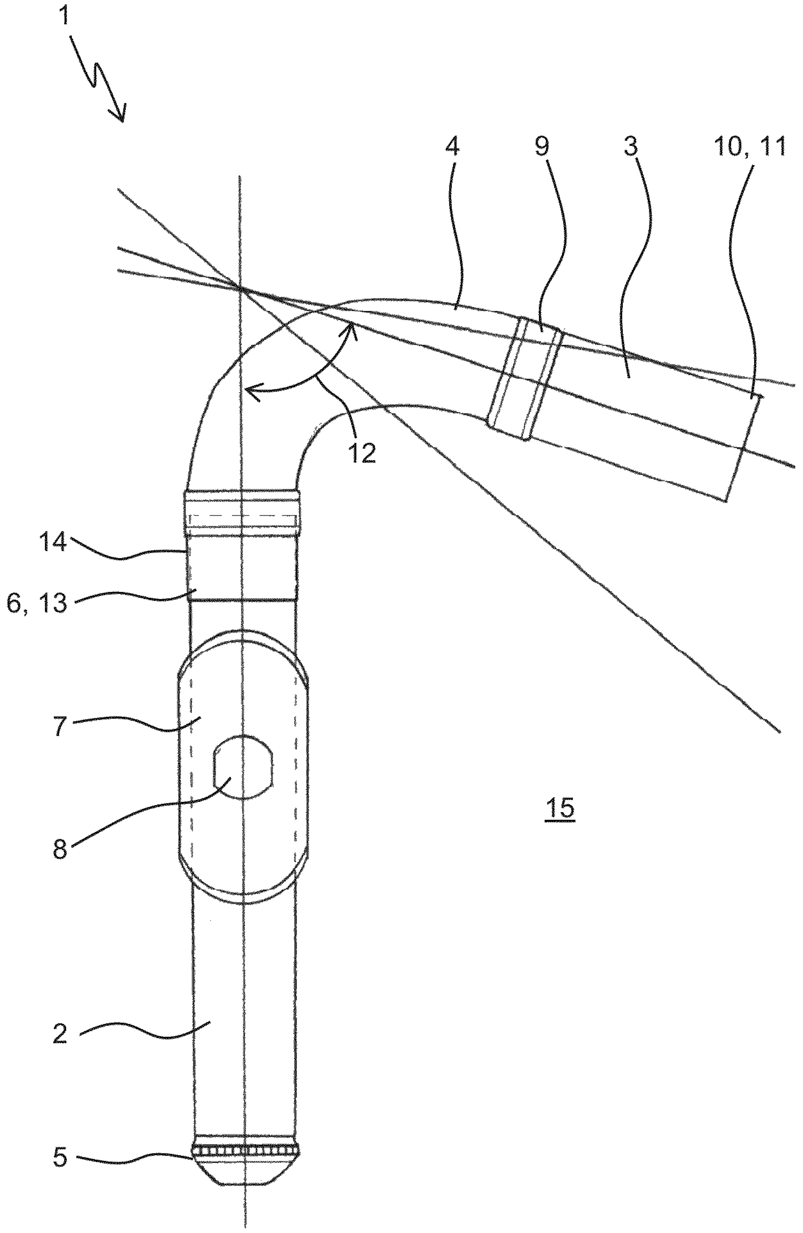
FIG. 1 is a drawing of a head joint in accordance with the invention.

FIG. 1 shows a head joint 1 in accordance with the invention for a transverse flute. The head joint 1 has a first leg 2 and a second leg 3 which are connected to one another by an arcuate transition curve 4.

The first leg 2 is configured as a substantially straight, pipe-like element. The first leg 2 is closed at its one end 5 while it is formed as an open pipe at its other end 6. In the region therebetween, an embouchure plate 7 having an embouchure hole 8 is arranged at the first leg 2.

The second leg 3 is—similarly to the first leg 2—configured as a substantially straight, pipe-like element. In this respect, the second leg 3 is formed as open toward its two ends 9, 10. At the end 10 facing away from the transition curve 4, the second leg 3 has a connection section 11 that can be inserted into a tube of a transverse flue not shown in FIG. 1.

The two legs 2 and 3 are connected to one another by the transition curve 4. The transition curve 4 is here likewise formed as a tubular element that is, however, not formed as straight, but as curved—unlike the legs 3 and 3. It is thus achieved that the two legs 2 and 3 are arranged at an angle 12 to one another. In the embodiment shown in FIG. 1, the angle 12 included by the legs 2 and 3 amounts to approximately 72°. As indicated in FIG. 1, however, other angles are also possible, e.g. between 50 and 80°.

The transition curve 4 is formed as rounded. I.e. corners and edges are avoided that could impair the formation of an air column for the sound production. The radius of curvature of the transition curve 4 is in the range of a few centimeters in the embodiment shown.

To connect the first leg 2 to the transition curve 4, the first leg 2 has a connection section 13 having an annular cross-section, with the connection section 13 being received in a reception section 14 that is formed by the transition curve 4 and that likewise has an annular cross-section. Since both the connection section 13 and the reception section 14 are formed with mutually coordinated annular cross-sections, the orientation of the first leg 2 can be freely set relative to the transition curve 4 in the peripheral direction. Since the connection between the first leg 2 and the transition curve 4 is releasable, the first leg 2 can selectively also be used as a classical, straight head joint such as is known from the prior art.

The second leg 3 is formed in once piece with the transition curve 4 in the embodiment shown in FIG. 1. Alternatively, however, they can also be formed as separate components that can e.g. be connected to one another by a plug-in connection.

The inner diameters and the cross-sections of the legs 2 and 3 and of the transition curve 4 are coordinated with one another such that a channel for the air flow results without edges or cracks in the interior of the head joint 1. Specifically, the inner diameter in the embodiment shown in FIG. 1 is constant, whereby a good sound quality can be achieved. Furthermore, the connection section 11 is preferably coordinated with the transverse flute for which the head joint 1 is to be used to also achieve a transition as free of cracks and edges as possible.

The two legs 2 and 3 and the transition curve 4 extend in a plane 15 that corresponds to the plane of the paper. Unlike as shown in FIG. 1, the transition curve could e.g. also be rotated out of the plane of the paper, whereby a three-dimensional design of the head joint would result.

Figure 2:
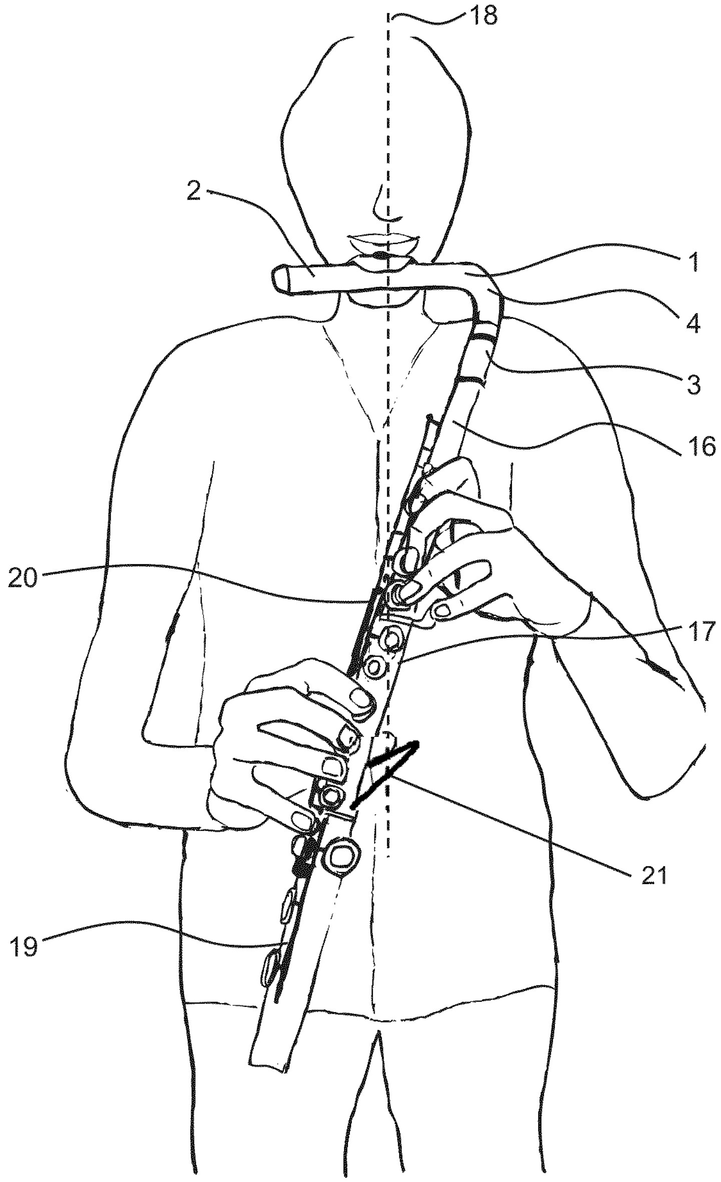
FIG. 2 is a drawing of a transverse flute having a head joint in accordance with the invention.

A transverse flute 16 having the head joint 1 is shown in FIG. 2. The connection of the head joint 1 to a tube 17 of the transverse flute 16 takes place here by the third leg 3 and more precisely by receiving the connection section 11 in a correspondingly formed reception section of the tube 17. The tube 17, the foot section 19, and the key mechanism 20 can be formed as known from the prior art.

As becomes visible from FIG. 2, a substantially symmetrical posture of the transverse flute 16 with respect to a vertical center axis 18 can be achieved by the design in accordance with the invention of the head joint 1.

Specifically, the first leg 2 is oriented substantially in parallel with the lips of the flautist in the horizontal direction. The transition curve 4 is here located to the left of the center axis 18—viewed from the flautist. The transverse flute 16 extends from there from the top left to the bottom right. The flautist here grips the transverse flute 16 with his left hand in the upper section that is located more on the left side close to the center axis 18. The flautist here grips the transverse flute 16 with his right hand in the lower section that is located more on the right side close to the center axis 18. A balanced posture thus results overall in which the flautist holds both arms oriented in the direction of the center axis 18, but does not have to grip over it, or at least not substantially.

This allows an upright posture of the spine and an erect, straight pelvis for the flautist. The upper arms lie angled outwardly evenly next to the upper body and the lower arms hold the transverse flute 16 in a relaxed manner in front of the thoracic spine to the navel in a slightly slanted form. Aches of the spine, tension pains in the shoulder and cervical vertebra region, particularly with professional musicians and advanced flautists, and aches due to the increased weight on the right arm, which above all relates to young flautists, can be substantially reduced or even eliminated. Furthermore, due to the symmetrical posture, optimum, free breathing is made possible without a constriction of the respiratory organs such is the case with transverse flutes known from the prior art.

In addition, the sound of the flute radiates evenly to the front in, for instance a concert hall or practice room due to the substantially vertical posture of the transverse flute 16. The sound vibrations through the tube held laterally to the right are predominantly conducted into the right side of the room with the traditional rotated posture. The sound on the left side can thereby be heard substantially less loudly. Due to the almost vertical orientation achieved with the head joint 2 in accordance with the invention, the sound is not only conducted directly evenly into the hall, which is more pleasing for listeners. A balanced acoustic pattern rather in particular results for the flautist himself.

REFERENCE NUMERAL LIST

1 head joint
2 leg

3 leg
4 transition curve
5 end
6 end
7 embouchure plate
8 embouchure hole
8 end
10 end
11 connection section
12 angle
13 connection section
14 reception section
15 plane
16 transverse flute
17 tube
18 center axis
19 foot section
20 key mechanism

The invention claimed is:

1. A head joint for a transverse flute of the type having a first leg, the first leg including an embouchure, and a second leg that are connectable to a tube of the transverse flute, the tube including a key mechanism, the head joint comprising:
- a joint connecting the first leg to the second leg such that the two legs are arranged at an angle to one another;
- wherein the tube is an extension of second leg; and
- wherein the angle formed inside a physical elongation of the two legs is an acute angle.

2. The head joint in accordance with claim 1, wherein the angle between the two legs is in the range from 50 to 80° or in the range from 70 to 75° or is 72°.

3. The head joint in accordance with claim 1, wherein the joint connects the first leg to the second leg by an arcuate transition curve.

4. A head joint for a transverse flute of the type having a first leg and a second leg that are connectable to a tube of the transverse flute, the head joint comprising:
- a joint connecting the first leg to the second leg such that the two legs are arranged at an angle to one another;
- wherein the angle formed between the two legs is an acute angle;
- wherein the joint connects the first leg to the second leg by an arcuate transition curve; and
- wherein a radius of curvature of the transition curve is at least 2 cm.

5. A head joint for a transverse flute of the type having a first leg and a second leg that are connectable to a tube of the transverse flute, the head joint comprising:
- a joint connecting the first leg to the second leg such that the two legs are arranged at an angle to one another;
- wherein the angle formed between the two legs is an acute angle;
- wherein the first leg and/or the second leg is/are releasably connected to the transition curve.

6. The head joint in accordance with claim 5, wherein the first leg and/or the second leg has/have a connection section that is insertable for connection to the transition curve into a reception section of the transition curve at an end side and is held in with a force fit.

7. The head joint in accordance with claim 1, wherein the first leg and the second leg extend in a common plane.

8. The head joint in accordance with claim 1, wherein an embouchure plate is arranged at the first leg.

9. The head joint in accordance with claim 1, wherein the second leg has a connection section that is insertable into the tube of the transverse flute and is connectable to it with a force fit.

10. The head joint in accordance with claim 9, wherein the connection section has an annular cross-section.

11. The head joint in accordance with claim 1, wherein the head joint is produced from wood, carbon, silver, titanium, metal, an alloy, or a combination of a plurality of materials.

12. A transverse flute comprising a head joint in accordance with claim 1.

13. The transverse flute in accordance with claim 12, further comprising a support element arranged at a tube of the transverse flute and projecting from the tube transversely to a longitudinal direction of the tube.

14. The transverse flute in accordance with claim 13, wherein the support element is arranged adjustably and/or removably along the tube and/or in a peripheral direction of the tube.

* * * * *